(12) United States Patent
Zou et al.

(10) Patent No.: US 10,824,258 B2
(45) Date of Patent: Nov. 3, 2020

(54) TOUCH DISPLAY PANEL

(71) Applicant: Wuhan China Star Optoelectronics Technology Co., Ltd., Wuhan (CN)

(72) Inventors: Gonghua Zou, Wuhan (CN); Yajing Yan, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 183 days.

(21) Appl. No.: 16/308,807

(22) PCT Filed: Sep. 27, 2018

(86) PCT No.: PCT/CN2018/107946
§ 371 (c)(1),
(2) Date: Dec. 10, 2018

(87) PCT Pub. No.: WO2019/205484
PCT Pub. Date: Oct. 31, 2019

(65) Prior Publication Data
US 2020/0319739 A1 Oct. 8, 2020

(30) Foreign Application Priority Data
Apr. 27, 2018 (CN) .......................... 2018 1 0390112

(51) Int. Cl.
*G02F 1/1345* (2006.01)
*G09G 3/20* (2006.01)
(Continued)

(52) U.S. Cl.
CPC ........ *G06F 3/0412* (2013.01); *G02F 1/13338* (2013.01); *G06F 3/044* (2013.01); *G06F 3/04166* (2019.05)

(58) Field of Classification Search
CPC combination set(s) only.
See application file for complete search history.

(56) References Cited

U.S. PATENT DOCUMENTS

2011/0085122 A1\* 4/2011 Fu ....................... G02F 1/13452
349/149

FOREIGN PATENT DOCUMENTS

CN 104615322 A 5/2015
CN 106371669 A 2/2017
(Continued)

*Primary Examiner* — Deeprose Subedi
(74) *Attorney, Agent, or Firm* — Leong C. Lei

(57) ABSTRACT

The invention provides a touch display panel, comprising: an active area and a non-active area located around the active area; the active area comprising: a plurality of electrode units arranged in an array; and a plurality of signal transmission lines extending in a column direction arranged sequentially along the electrode units; the non-active area comprising: an auxiliary signal line surrounding the active area, a driving signal source connected to the auxiliary signal line, and a plurality of fanout lines connected to the driving signal source; the signal transmission lines comprising: a plurality of main signal transmission lines connected to electrode units, and a plurality of dummy signal lines connected to auxiliary signal line, wherein the main signal transmission lines connected to driving signal source respectively through fanout lines. The invention reduces number of channels of driving signal source and line density in fanout area to reduce production cost and difficulty.

8 Claims, 7 Drawing Sheets

(51) Int. Cl.
*G06F 3/041* (2006.01)
*G02F 1/1333* (2006.01)
*G06F 3/044* (2006.01)

(56) References Cited

FOREIGN PATENT DOCUMENTS

| | | |
|---|---|---|
| CN | 106990869 A | 7/2017 |
| CN | 206649492 U | 11/2017 |
| CN | 108563362 A | 9/2018 |

\* cited by examiner

TOUCH DISPLAY PANEL

BACKGROUND OF THE INVENTION

1. Field of the Invention

The present invention relates to the field of display, and in particular to a touch display panel.

2. The Related Arts

The touch panel provides a new human-machine interface that is more straightforward and user-friendly. The touch panel and the liquid crystal display (LCD) panel are integrated to form a touch display panel able to provide the LCD panel with a touch function so that the user can perform an input operation through a finger, a stylus, and the like, and the operation is more intuitive and simpler.

Touch display panels can be divided into resistive, capacitive, optical, and acoustic waves types according to different sensing technologies. Currently, the mainstream touch technology is capacitive. The touch display panel can also be divided into: an embedded touch display panel and an add-on touch display panel according to different structures. For the add-on touch display panel, the touch panel and the liquid crystal display panel are separately produced, and then fit together to form a display panel with a touch function. The add-on touch display panel has higher manufacturing cost and lower light transmittance, thicker modules and other shortcomings. The embedded touch display panel embeds the touch panel function into the liquid crystal display panel, so that the liquid crystal display panel has the functions of displaying and sensing the touch input at the same time. Compared to the add-on touch display panel, the embedded touch display panel has the advantages of lower cost and less thickness, and is favored by major panel manufacturers.

Moreover, the embedded touch display panel is further divided into two types according to different positions of the touch circuit embedded in the liquid crystal display panel: the On-Cell type wherein the touch circuit is on the liquid crystal cell, and the In-Cell type wherein the touch circuit is in the liquid crystal cell. Compared with the On-Cell touch display panel, the In-Cell touch display panel can realize the thinner and lighter panel, and has been adopted by the majority of mobile phone manufacturers and evolved into the mainstream of the future touch technology. In the In-Cell touch display panel, the touch layer is shared with the common electrode (Vcom) layer of the liquid crystal display panel. Specifically, the common electrode layer covered by the entire surface is divided into a plurality of electrode units arranged in an array. The plurality of electrode units is electrically connected to a touch and display driver integration (TDDI) through a lead wire. When driving, the frame time is divided into a display phase and a touch sensing phase. In the display phase, the TDDI chip provides a common voltage signal (Vcom) to each of the electrode units through the lead wire for screen display, and the TDDI chip provides a touch sensing signal to each electrode unit through the lead wire during the touch sensing phase for touch sensing.

In general, the TDDI chip used in the In-Cell touch display panel can only support a fixed number of resolutions. The size of each electrode unit in the In-Cell touch display panel can only be 3 mm×3 mm-5 mm×5 mm in general. Because if the area of a single electrode unit is too large, the touch sensitivity will be reduced. If the area of a single electrode unit is too small, the noise of the touch will increase correspondingly. Therefore, in the existing In-Cell touch display panel, after the size of the panel is determined, the number of rows and the number of columns of the electrode units are also basically determined, and the distribution pattern of the lead wires connecting each of the electrode units is also basically determined. For example, as shown in FIG. 1, an existing In-Cell touch display is provided. In the panel, each of the electrode units 101 is electrically connected to two connection lead wires 102 correspondingly. The two connection lead wires 102 are connected in parallel and then to an output channel of the driving signal source 103 to receive a common voltage from the driving signal source 103 or a touch sensing signal. Moreover, as shown in FIG. 2, to prevent the light blocking of the connection lead wires 102 from affecting the aperture ratio of the display panel, each of the above-mentioned connection lead wires 102 is respectively disposed at a location corresponding to the area where the black matrix (BM) strips 105 are located between two columns of color-resisting blocks 104, and the adjacent two connection lead wires 102 are separated by a column of pixels, that is, three columns of color-resisting blocks 106.

When the resolution of the touch display panel is a special resolution, the size of the touch display panel is large, or the touch display panel has a special shaped, the number of each column of electrode units 101 in the design may be increased or decreased compared to the conventional design. Accordingly, the number of connection lead wires 102 required for each column of electrode units 101 also needs to be increased or decreased. As the size of each electrode unit 101 does not change, and the number of columns of color-resisting blocks 104 corresponding to each column of electrode unit 101 is also constant, a possible scenario would occur wherein the number of connection lead wires 102 (i.e., the number of black matrix strips 105) able to be arranged in the area corresponding to each column of electrode units 101 and the number of electrode units 101 included in each column of electrode units 101 do not match. That is, after the connection lead wires 102 are connected to all the electrode units 101, a large number of dummy connection lead wires which are not connected to the electrode unit 101 remains. To ensure touch sensitivity and uniformity, the dummy connection lead wires also need to be electrically connected to the driving signal source 103, which results in a large increase in the number of output channels of the driving signal source 103. As the wire density of the fanout connected to the driving signal source 103 increases, the manufacturing cost and difficulty also increases.

SUMMARY OF THE INVENTION

The object of the present invention is to provide a touch display panel, able to reduce the number of channels of the driving signal source and line density in the fanout area to reduce the production cost and difficulty.

To achieve the above object, the present invention provides a touch display panel, which comprises: an active area and a non-active area located in peripheral of the active area;

the active area comprising: a plurality of electrode units arranged in an array; and a plurality of signal transmission lines extending in a column direction arranged sequentially along the electrode units;

the non-active area comprising: an auxiliary signal line surrounding the active area, a driving signal source electrically connected to the auxiliary signal line, and a plurality of fanout lines electrically connected to the driving signal source;

the signal transmission lines comprising: a plurality of main signal transmission lines electrically connected to the plurality of electrode units, and a plurality of dummy signal lines electrically connected to the auxiliary signal lines, wherein the plurality of main signal transmission lines being electrically connected to the driving signal source respectively through the plurality of fanout lines;

the driving signal source being configured to provide a common voltage signal to the auxiliary signal line and the main signal transmission lines during a display phase, and provide a touch sensing signal to the auxiliary signal line and the main signal transmission line during a touch sensing phase.

Preferably, the active area further comprises: a plurality of color-resisting blocks arranged in an array disposed opposite to the plurality of electrode units; and a black matrix located between adjacent color-resisting blocks, each of the signal transmission lines being correspondingly blocked by the black matrix located between two adjacent columns of color-resisting blocks.

Preferably, every two adjacent signal transmission lines form a group, the two signal transmission lines in the same group are separated by two columns of color-resisting blocks, the two adjacent signal transmission lines in different groups are separated by a column of color-resisting blocks, and the signal transmission lines in the same group are both main signal transmission lines or both dummy signal lines.

Preferably, every two adjacent signal transmission lines form a group, the two signal transmission lines in the same group are separated by a column of color-resisting blocks, the two adjacent signal transmission lines in different groups are separated by a column of color-resisting blocks, and the signal transmission lines in the same group are both main signal transmission lines or both dummy signal lines.

Preferably, the two main signal transmission lines in the same group are electrically connected to the same electrode unit, and are electrically connected to the driving signal source through the same fanout line.

Preferably, a column of color-resisting blocks is disposed between each adjacent two signal transmission lines.

Preferably, each of the electrode units is electrically connected to two main signal transmission lines, and each of the main signal transmission lines is electrically connected to the driving signal source through a corresponding fanout line.

Preferably, the signal transmission line and the fanout line are both located in a first film layer, and the electrode unit and the auxiliary signal line are both located in a second film layer stacked with the first film layer.

Preferably, the auxiliary signal line is located on a third film layer, and the signal transmission line and the fanout line are both located on the first film layer stacked with the third film layer, and the electrode units are all located on the second film layer stacked with the first film layer.

Preferably, the driving signal source comprises a plurality of first output channels and a second output channel, each of the first output channels is electrically connected to one of the fanout lines, and the second output channel is electrically connected to the auxiliary signal line.

The present invention provides the following advantages: the invention provides a touch display panel. The touch display panel comprises: an active area and a non-active area located around the active area; the active area comprising: a plurality of electrode units arranged in an array; and a plurality of signal transmission lines extending in a column direction arranged sequentially along the electrode units; the non-active area comprising: an auxiliary signal line surrounding the active area, a driving signal source electrically connected to the auxiliary signal line, and a plurality of fanout lines electrically connected to the driving signal source; the signal transmission lines comprising: a plurality of main signal transmission lines electrically connected to the plurality of electrode units, and a plurality of dummy signal lines electrically connected to the auxiliary signal lines, wherein the plurality of main signal transmission lines being electrically connected to the driving signal source respectively through the plurality of fanout lines. By connecting the plurality of dummy signal lines to the auxiliary signal line and then to the driving signal source, the invention achieves using a dummy signal line to provide signals, reduce the number of channels of the driving signal source and line density in the fanout area to reduce the production cost and difficulty.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
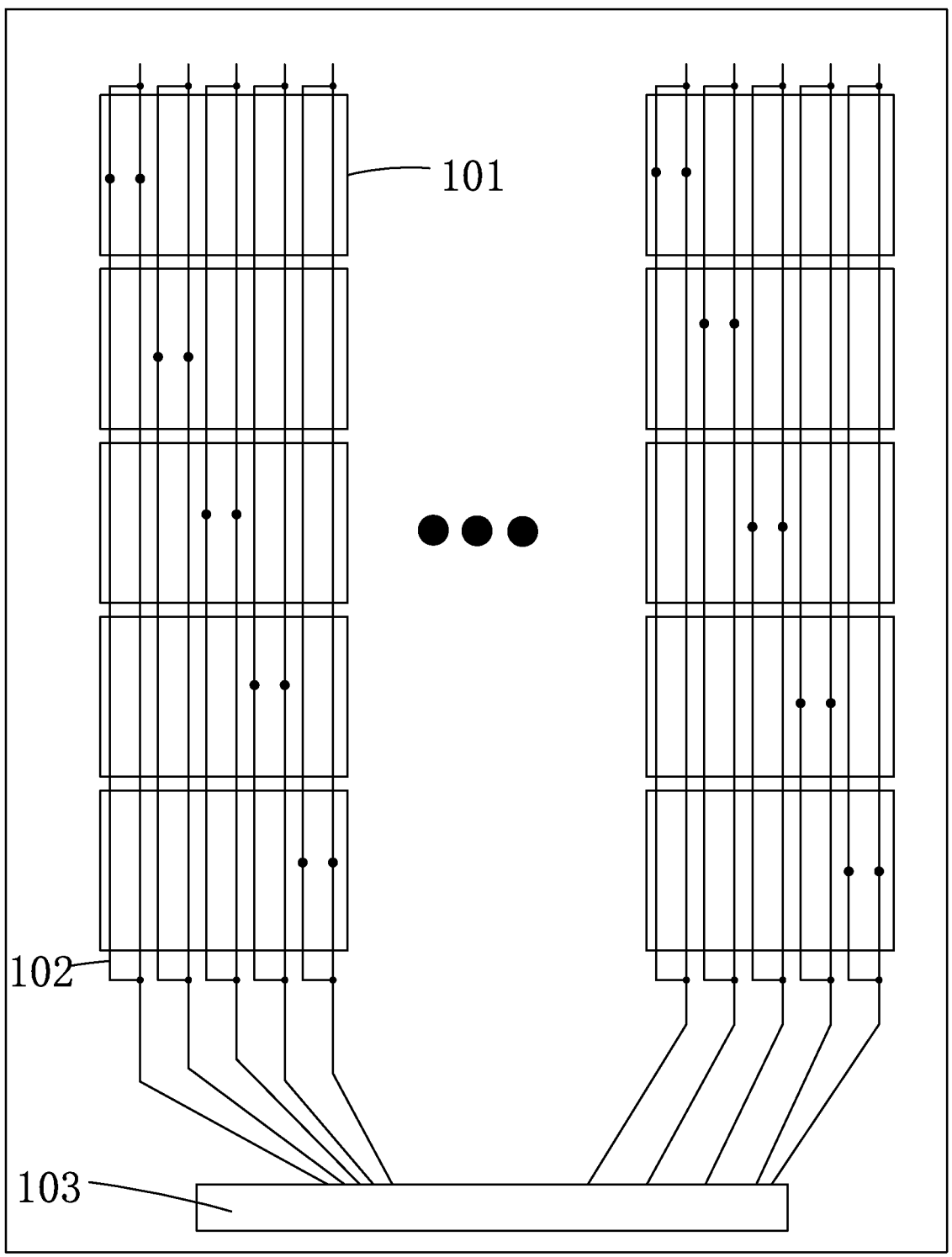
FIG. 1 is a schematic view showing the structure of a known touch display panel.
Figure 2:
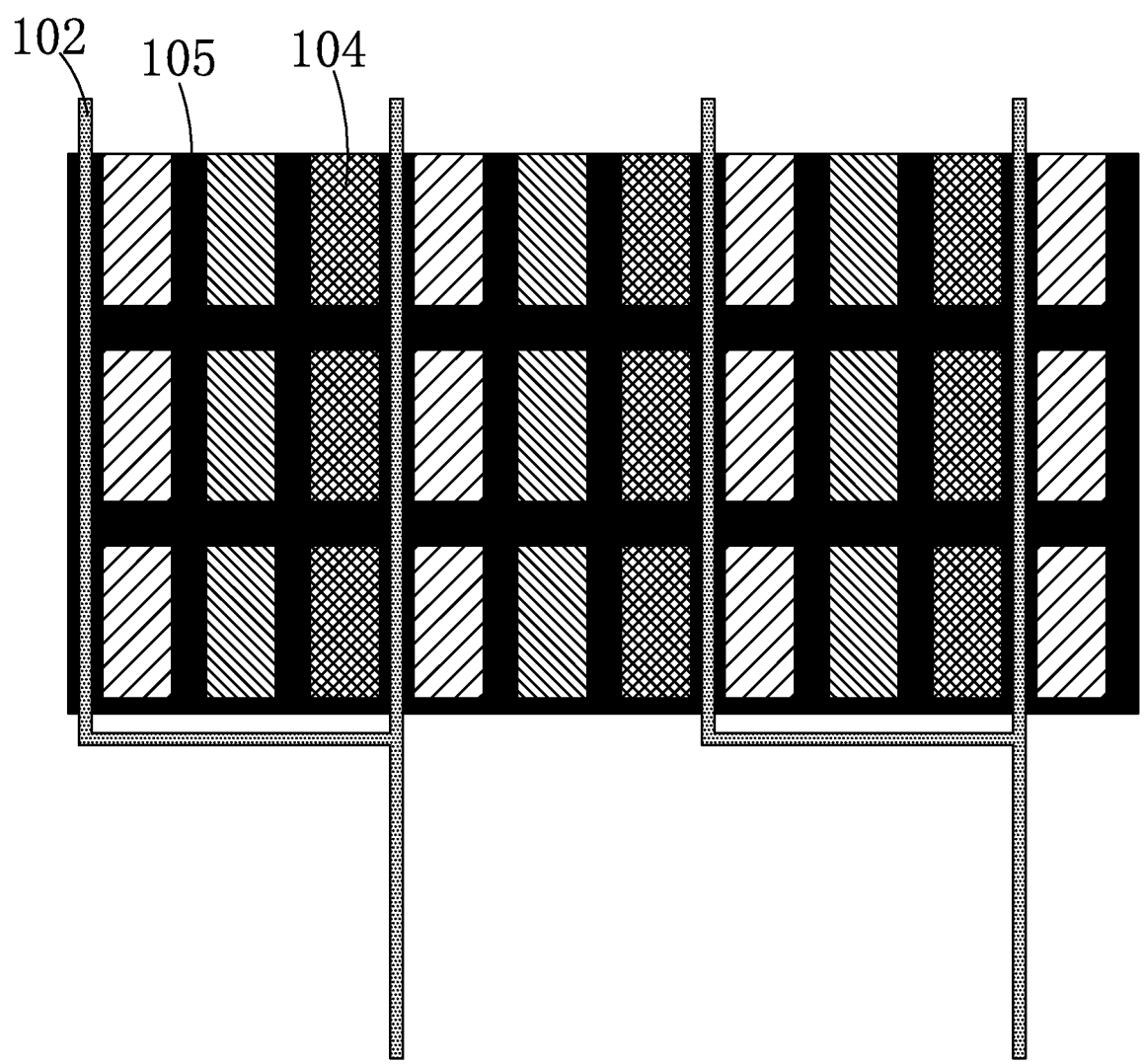
FIG. 2 is a schematic view showing the correspondence relation between the connection lead wires and black matrix in the known touch display panel.
Figure 3:
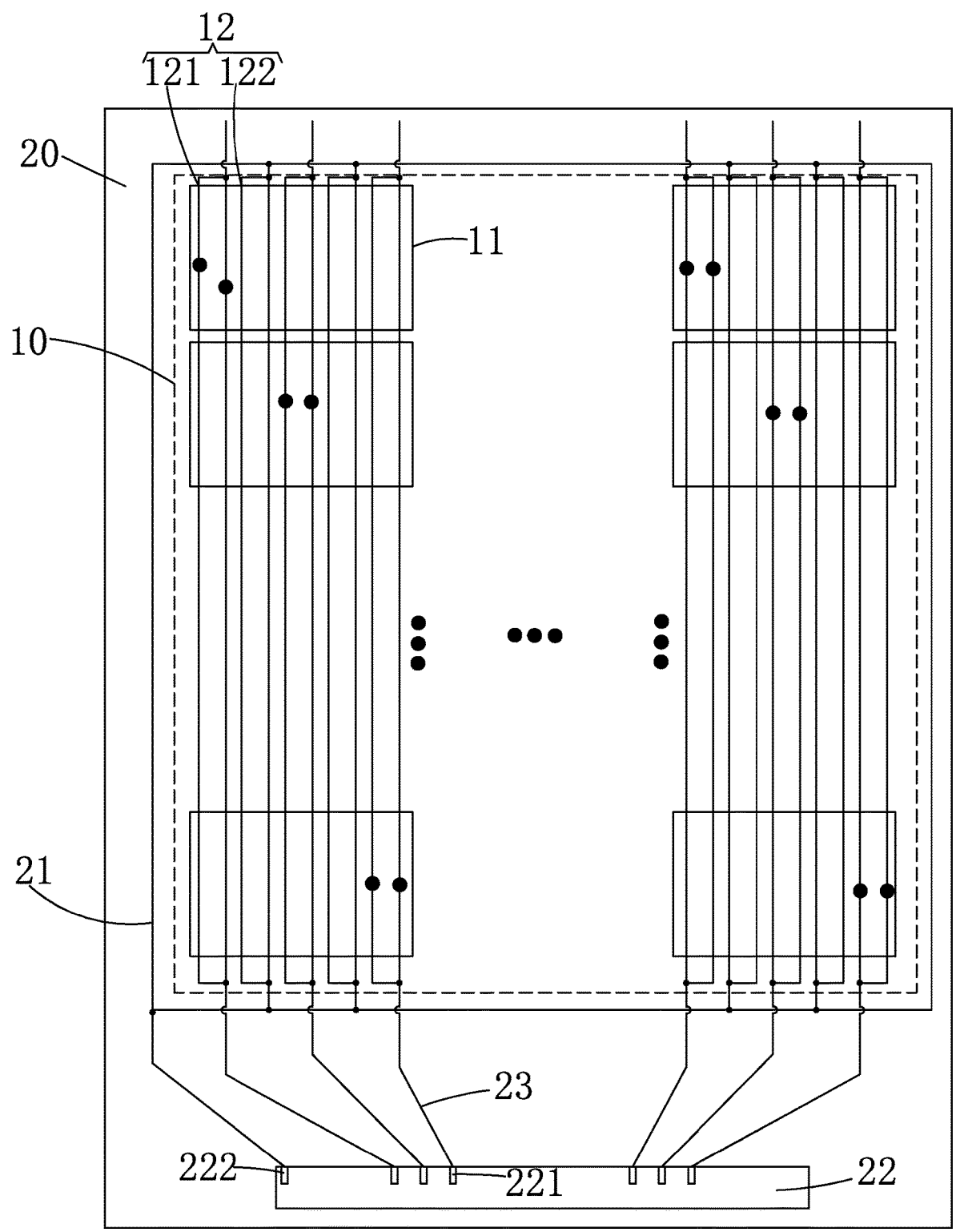
FIG. 3 is a schematic view showing the structures of the first embodiment and second embodiment of the touch display panel of the present invention.
Figure 6:
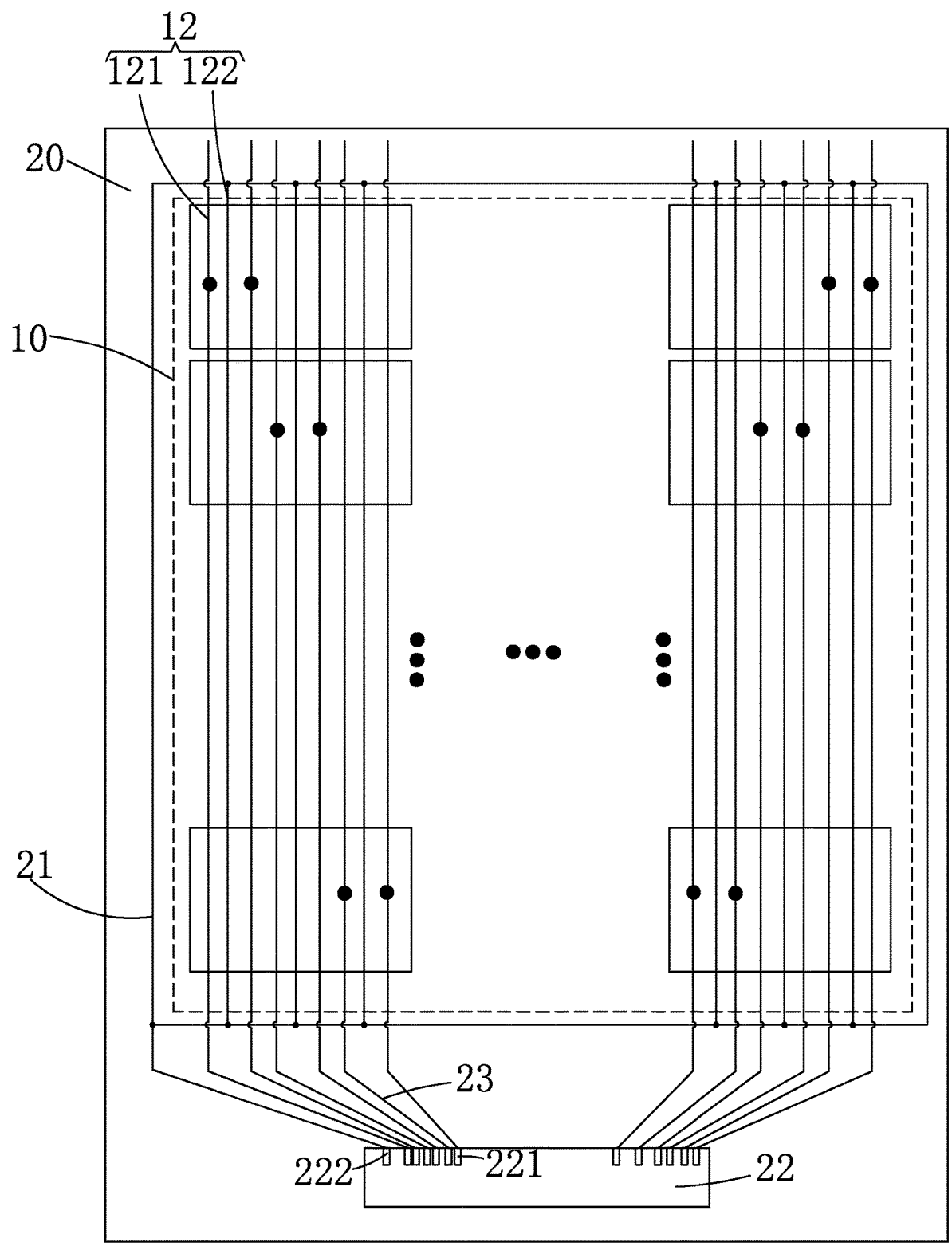
FIG. 6 is a schematic view showing the structure of the third embodiment of the touch display panel of the present invention.

Refer to FIG. 3 or FIG. 6. The present invention provides a touch display panel, which comprises: an active area 10 and a non-active area 20 located in peripheral of the active area 10;

the active area 10 comprising: a plurality of electrode units 11 arranged in an array; and a plurality of signal transmission lines 12 extending in a column direction arranged sequentially along the electrode units 11; the non-active area 20 comprising: an auxiliary signal line 21 surrounding the active area 10, a driving signal source 22 electrically connected to the auxiliary signal line 21, and a plurality of fanout lines 23 electrically connected to the driving signal source 22; the signal transmission lines 12 comprising: a plurality of main signal transmission lines 121 electrically connected to the plurality of electrode units 11, and a plurality of dummy signal lines 122 electrically connected to the auxiliary signal lines 21, wherein the plurality of main signal transmission lines 121 being electrically connected to the driving signal source 22 respectively through the plurality of fanout lines 23.

Specifically, the driving signal source 22 is configured to provide a common voltage signal to the auxiliary signal line 21 and the main signal transmission lines 121 during a display phase, and provide a touch sensing signal to the auxiliary signal line 21 and the main signal transmission line 121 during a touch sensing phase.

Specifically, as shown in FIG. 3 or FIG. 6, the top end and the bottom end of the dummy signal line 122 are both electrically connected to the auxiliary signal line 21.

Specifically, the active area 10 further comprises: a plurality of color-resisting blocks 30 arranged in an array disposed opposite to the plurality of electrode units 11; and a black matrix 40 located between adjacent color-resisting blocks 30, each of the signal transmission lines 12 is correspondingly blocked by the black matrix 40 located between two adjacent columns of color-resisting blocks 30. Each color-resisting block 30 is used to form a sub-pixel.

Preferably, the plurality of color-resisting blocks 30 comprise a red color-resisting block, a green color-resisting block, and a blue color-resisting block sequentially arranged in the row direction.

Specifically, the touch display panel comprises: a first substrate and a second substrate disposed opposite to the first substrate. Preferably, the electrode unit 11, the signal transmission line 12, the auxiliary signal line 21, the driving signal source 22, and the fanout line 23 are all disposed on the first substrate, and the color-resisting block 30 and the black matrix 40 are disposed on the second substrate. A liquid crystal layer is further disposed between the first substrate and the second substrate.

Specifically, in some embodiments of the present invention, the auxiliary signal line 21 is located in the third film layer, and the signal transmission line 12 and the fanout line 23 are both located in the first film layer stacked with the third film layer, and the electrode unit 11 is located at the second film layer stacked with the film layer. A first insulating layer is formed between the first film layer and the second film layer, and a second insulating layer is formed between the first film layer and the third film layer. The main signal transmission line 121 is electrically connected to the electrode unit 11 through a via hole penetrating through the first insulating layer, and the dummy signal transmission line 122 is electrically connected to the auxiliary signal line 21 through a via hole penetrating through the second insulating layer.

Moreover, the third film layer is a gate metal layer for forming a gate line and a gate of the touch display panel or a source/drain metal layer for forming a source line and a source and a drain of the touch display panel. In this case, to prevent the auxiliary signal line 21 from being short-circuited with the source line or the gate line, when the auxiliary signal line 21 is located in the gate metal layer, the gate line is bridged to the source/drain metal layer through the via hole at the position where the auxiliary signal line 21 intersects the auxiliary signal line 21 to avoid shorting with the auxiliary signal line 21, and when the auxiliary signal line 21 is located at the source/drain metal layer, the source line is bridged to the gate metal layer through the via hole at the position intersecting the auxiliary signal line 21 to avoid shorting with the auxiliary signal line 21.

Specifically, in another embodiment of the present invention, the signal transmission line 12 and the fanout line 23 are both located in the first film layer, and the electrode unit 11 and the auxiliary signal line 21 are both located in the second film layer stacked with the first film layer. That is, the auxiliary signal line 21 is located in the same layer as the electrode unit 11, and an insulating layer is formed between the first film layer and the second film layer. The main signal transmission line 121 is electrically connected to the electrode unit 11 through a via hole penetrating through the insulating layer. The dummy signal transmission line 122 is electrically connected to the auxiliary signal line 21 through a via hole penetrating through the insulating layer.

Moreover, in other embodiments described above, there is no problem of short-circuiting the auxiliary signal line 21 with the source line or the gate line, and the source line and the gate line may be directly formed according to the prior art. The formation of the auxiliary signal line 21 is only required by changing the pattern of the second film layer in which the electrode unit 11 is located.

In specific application, the number and arrangement of the signal transmission lines 12 can be selected according to the number of electrode units 11 in each column of electrode units 11 and the number of signal transmission lines 12 that can be formed in the area corresponding to each column of electrode units 11.

Figure 4:
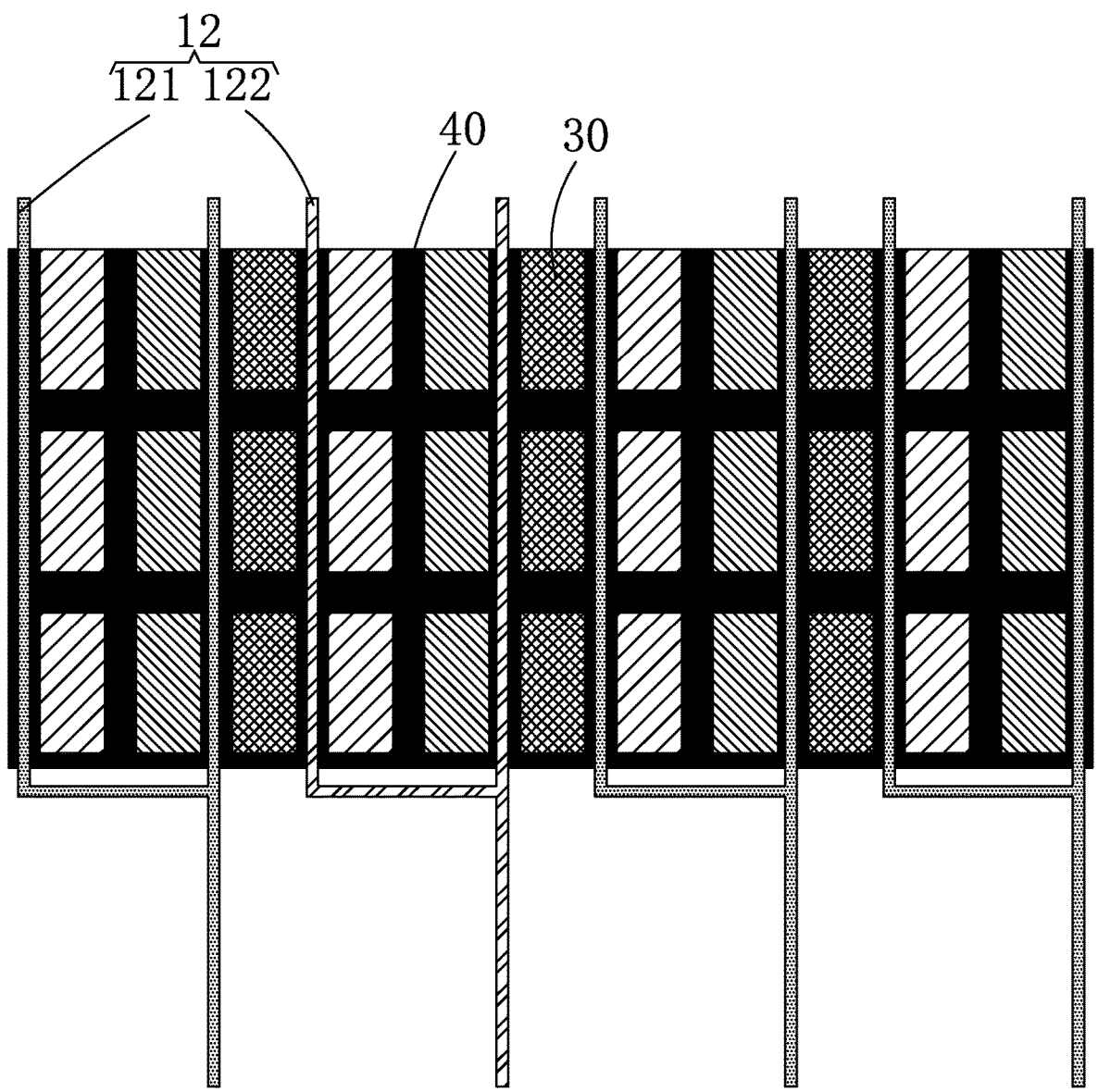
FIG. 4 is a schematic view showing the correspondence relation between the connection lead wires and black matrix in the first embodiment of the touch display panel of the present invention.

Optionally, as shown in FIG. 3 and FIG. 4, in the first embodiment of the present invention, every two adjacent signal transmission lines 12 form a group, the two signal transmission lines 12 in the same group are separated by two columns of color-resisting blocks 30, the two adjacent signal transmission lines 12 in different groups are separated by a column of color-resisting blocks 30, and the signal transmission lines 12 in the same group are both main signal transmission lines 121 or both dummy signal lines 122. The two main signal transmission lines 121 in the same group are electrically connected to the same electrode unit 11, and are electrically connected to the driving signal source 22 through the same fanout line 23. Moreover, in the first embodiment of the present invention, three consecutive groups of signal transmission lines 12 arranged in series form a repeating unit, and the signal transmission lines 12 in the middle group in the same repeating unit are dummy signal lines 122, and the signal transmission lines 12 in two groups of signal transmission lines 12 on both sides are all the main signal transmission lines 121.

Figure 5:
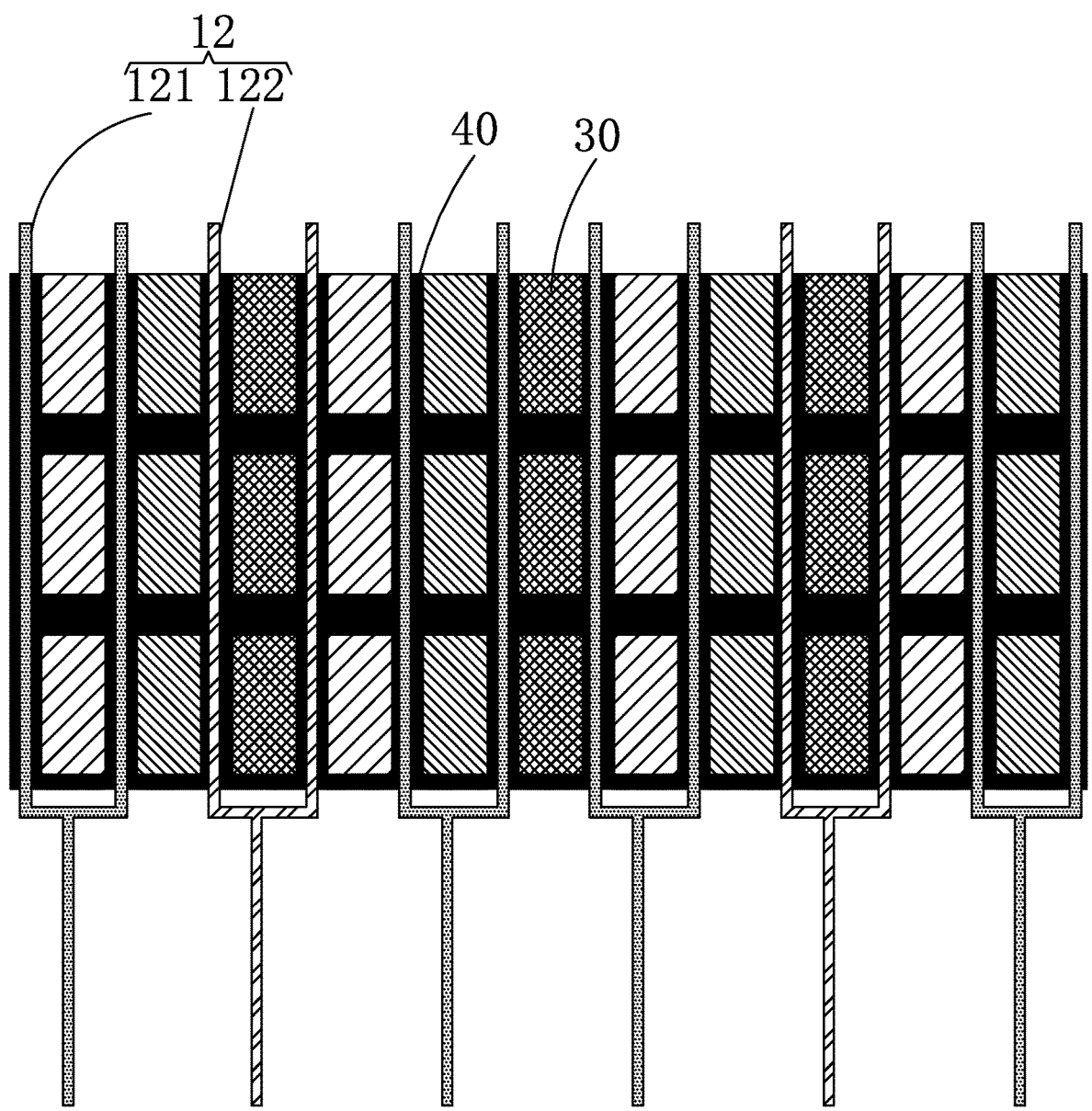
FIG. 5 is a schematic view showing the correspondence relation between the connection lead wires and black matrix in the second embodiment of the touch display panel of the present invention.

Optionally, as shown in FIG. 3 and FIG. 5, in the second embodiment of the present invention, every two adjacent signal transmission lines 12 form a group, the two signal transmission lines 12 in the same group are separated by a column of color-resisting blocks 30, the two adjacent signal transmission lines 12 in different groups are separated by a column of color-resisting blocks 30, and the signal transmission lines 12 in the same group are both main signal transmission lines 121 or both dummy signal lines 122. Moreover, in the second embodiment of the present invention, three consecutive groups of signal transmission lines 12 arranged in series form a repeating unit, and the signal transmission lines 12 in the middle group in the same repeating unit are dummy signal lines 122, and the signal transmission lines 12 in two groups of signal transmission lines 12 on both sides are all the main signal transmission lines 121.

Figure 7:
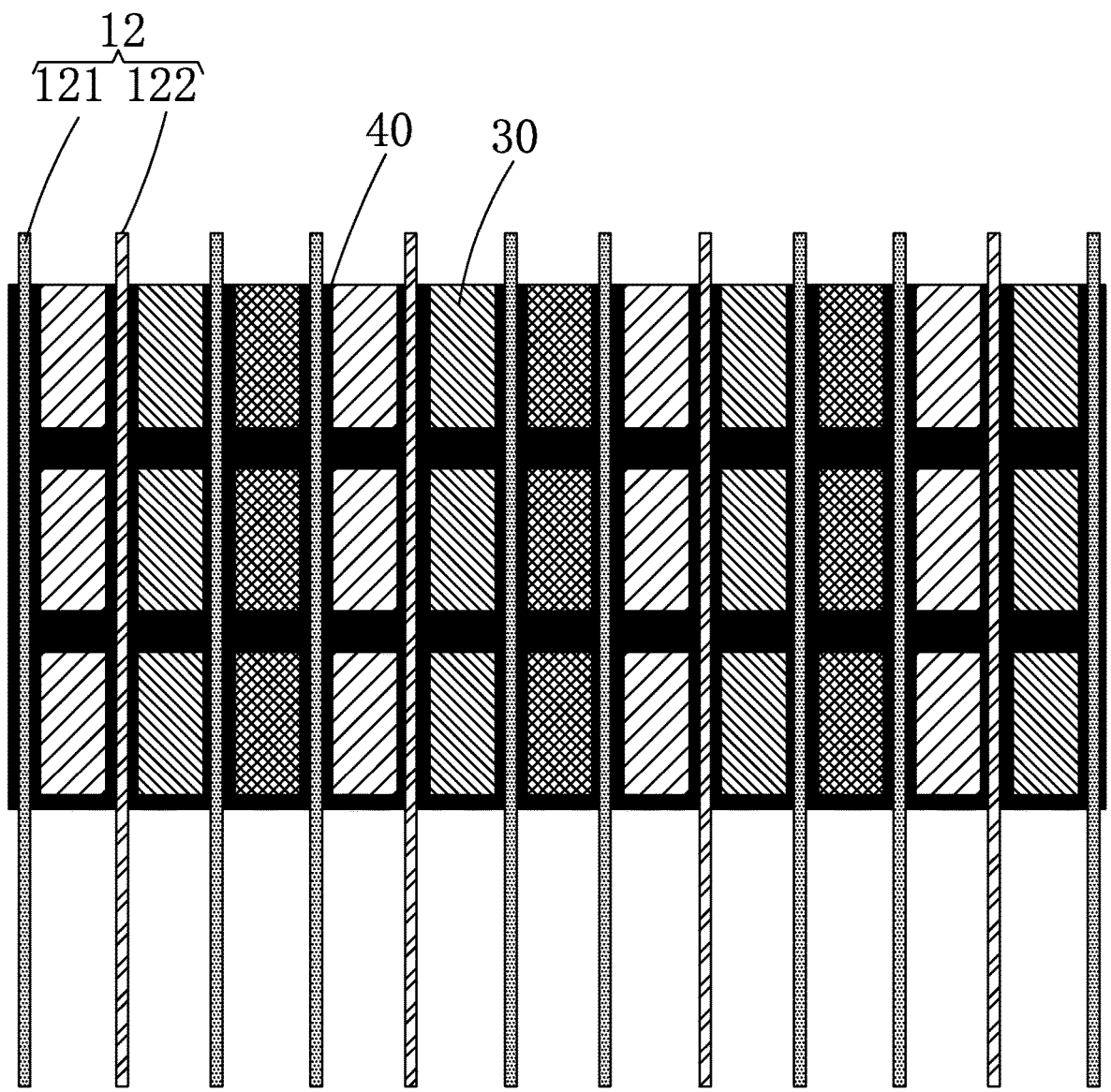
FIG. 7 is a schematic view showing the correspondence relation between the connection lead wires and black matrix in the third embodiment of the touch display panel of the present invention.

Optionally, as shown in FIG. 6 and FIG. 7, in the third embodiment of the present invention, a column of color-resisting blocks 30 is disposed between each adjacent two signal transmission lines 12. Each of the electrode units 11 is electrically connected to two main signal transmission lines 121, and each of the main signal transmission lines 121 is electrically connected to the driving signal source 22 through a corresponding fanout line 23. Moreover, in the third embodiment of the present invention, three consecutive groups of signal transmission lines 12 arranged in series form a repeating unit, and the signal transmission lines 12 in the middle group in the same repeating unit are dummy signal lines 122, and the signal transmission lines 12 in two groups of signal transmission lines 12 on both sides are all the main signal transmission lines 121.

Specifically, as shown in FIG. 3 and FIG. 6, the driving signal source 22 comprises a plurality of first output channels 221 and a second output channel 222, each of the first output channels 221 is electrically connected to one of the fanout lines 23, and the second output channel 222 is electrically connected to the auxiliary signal line 21. Each of the fanout lines 23 is connected to one or two main signal transmission lines 121 depending on the requirements.

It should be noted that when the touch display panel of the present invention is in operation, the waveform of the signal on the auxiliary signal line 21 and the waveform of the signal on the main signal transmission line 121 are always consistent, so that the signal on the main signal transmission line 121 and the dummy signal line 122 are always maintained. By connecting the plurality of dummy signal lines 122 to the auxiliary signal line 21 and then to the driving signal source 22, the invention achieves using a dummy signal line to provide signals to a plurality of dummy signal lines 122 through one output channel, reduce the number of channels of the driving signal source 22 and line density in the fanout area to reduce the production cost and difficulty.

In summary, the invention provides a touch display panel. The touch display panel comprises: an active area and a non-active area located around the active area; the active area comprising: a plurality of electrode units arranged in an array; and a plurality of signal transmission lines extending in a column direction arranged sequentially along the electrode units; the non-active area comprising: an auxiliary signal line surrounding the active area, a driving signal source electrically connected to the auxiliary signal line, and a plurality of fanout lines electrically connected to the driving signal source; the signal transmission lines comprising: a plurality of main signal transmission lines electrically connected to the plurality of electrode units, and a plurality of dummy signal lines electrically connected to the auxiliary signal lines, wherein the plurality of main signal transmission lines being electrically connected to the driving signal source respectively through the plurality of fanout lines. By connecting the plurality of dummy signal lines to the auxiliary signal line and then to the driving signal source, the invention achieves using a dummy signal line to provide signals to a plurality of dummy signal lines through one output channel, reduce the number of channels of the driving signal source and line density in the fanout area to reduce the production cost and difficulty.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A touch display panel, comprising: an active area, and a non-active area located in peripheral of the active area;
    the active area comprising: a plurality of electrode units arranged in an array; and a plurality of signal transmission lines extending in a column direction arranged sequentially along the electrode units;
    the non-active area comprising: an auxiliary signal line surrounding the active area, a driving signal source electrically connected to the auxiliary signal line, and a plurality of fanout lines electrically connected to the driving signal source;
    the signal transmission lines comprising: a plurality of main signal transmission lines electrically connected to the plurality of electrode units, and a plurality of dummy signal lines electrically connected to the auxiliary signal lines, wherein the plurality of main signal transmission lines being electrically connected to the driving signal source respectively through the plurality of fanout lines;
    the driving signal source being configured to provide a common voltage signal to the auxiliary signal line and the main signal transmission lines during a display phase, and provide a touch sensing signal to the auxiliary signal line and the main signal transmission line during a touch sensing phase;
    wherein the active area further comprises: a plurality of color-resisting blocks arranged in an array disposed opposite to the plurality of electrode units; and a black matrix located between adjacent color-resisting blocks, each of the signal transmission lines being correspondingly blocked by the black matrix located between two adjacent columns of color-resisting blocks;
    wherein every two adjacent signal transmission lines form a group, the two signal transmission lines in the same group are separated by two columns of color-resisting blocks, the two adjacent signal transmission lines in different groups are separated by a column of color-resisting blocks, and the signal transmission lines in the same group are both main signal transmission lines or both dummy signal lines.

2. The touch display panel as claimed in claim 1, wherein every two adjacent signal transmission lines form a group, the two signal transmission lines in the same group are separated by a column of color-resisting blocks, the two adjacent signal transmission lines in different groups are separated by a column of color-resisting blocks, and the signal transmission lines in the same group are both main signal transmission lines or both dummy signal lines.

3. The touch display panel as claimed in claim 1, wherein the two main signal transmission lines in the same group are electrically connected to the same electrode unit, and are electrically connected to the driving signal source through the same fanout line.

4. The touch display panel as claimed in claim 1, wherein a column of color-resisting blocks is disposed between each adjacent two signal transmission lines.

5. The touch display panel as claimed in claim 4, wherein each of the electrode units is electrically connected to two main signal transmission lines, and each of the main signal transmission lines is electrically connected to the driving signal source through a corresponding fanout line.

6. The touch display panel as claimed in claim 1, wherein the signal transmission line and the fanout line are both located in a first film layer, and the electrode unit and the auxiliary signal line are both located in a second film layer stacked with the first film layer.

7. The touch display panel as claimed in claim 1, wherein the auxiliary signal line is located on a third film layer, and the signal transmission line and the fanout line are both located on the first film layer stacked with the third film layer, and the electrode units are all located on the second film layer stacked with the first film layer.

8. The touch display panel as claimed in claim 1, wherein the driving signal source comprises a plurality of first output channels and a second output channel, each of the first output channels is electrically connected to one of the fanout lines, and the second output channel is electrically connected to the auxiliary signal line.

* * * * *